(12) United States Patent
Okuda

(10) Patent No.: US 7,427,331 B2
(45) Date of Patent: Sep. 23, 2008

(54) METHOD AND APPARATUS FOR MANUFACTURING COMPOSITE PRODUCT

(75) Inventor: Hideki Okuda, Nagoya (JP)

(73) Assignee: Denso Corporation (JP)

( * ) Notice: Subject to any disclaimer, the term of this patent is extended or adjusted under 35 U.S.C. 154(b) by 415 days.

(21) Appl. No.: 11/052,855

(22) Filed: Feb. 9, 2005

(65) Prior Publication Data

US 2005/0173055 A1    Aug. 11, 2005

(30) Foreign Application Priority Data

Feb. 9, 2004    (JP) .............................. 2004-032200

(51) Int. Cl.
   *B29C 65/00*    (2006.01)
(52) U.S. Cl. .................. 156/272.8; 156/303.1; 156/293
(58) Field of Classification Search .............. 156/272.8, 156/293, 303.1, 272.2, 304.2, 304.6, 308.2, 156/309.9
   See application file for complete search history.

(56) References Cited

U.S. PATENT DOCUMENTS

| | | | | |
|---|---|---|---|---|
| 4,670,207 A | * | 6/1987 | Yamada et al. .............. 264/248 |
| 5,386,101 A | * | 1/1995 | Steinmetz et al. ........... 219/535 |
| 5,893,959 A | * | 4/1999 | Muellich .................. 156/272.8 |
| 5,928,453 A | * | 7/1999 | Kawamoto ............... 156/275.1 |
| 6,596,122 B1 | * | 7/2003 | Savitski et al. ........... 156/304.2 |
| 6,692,597 B2 | * | 2/2004 | Mako et al. ............... 156/89.11 |

FOREIGN PATENT DOCUMENTS

JP    2002-248688    9/2002
JP    2003-19752    1/2003

OTHER PUBLICATIONS

Machine Translation of JP2003019752A2.*

* cited by examiner

*Primary Examiner*—John L. Goff
*Assistant Examiner*—Daniel McNally
(74) *Attorney, Agent, or Firm*—Nixon & Vanderhye PC

(57) ABSTRACT

In a manufacturing method of a composite product, a first resin part and a second resin part are prepared. The first resin part has an opening of which inner diameter decreases in an axial direction thereof. The second resin part is inserted into the opening of the first resin part. An outer surface of the second resin part is pressed to an inner surface of the opening of the first resin part. Then a laser beam is radiated to a contacting area between the outer surface of second resin part and the inner surface of first resin part, with pressing the outer surface to the inner surface.

2 Claims, 12 Drawing Sheets

METHOD AND APPARATUS FOR MANUFACTURING COMPOSITE PRODUCT

CROSS REFERENCE TO RELATED APPLICATION

This application is based on Japanese Patent Application No. 2004-032200 filed on Feb. 9, 2004, the disclosure of which is incorporated herein by reference.

FIELD OF THE INVENTION

The present invention relates to a method and an apparatus for manufacturing a composite product.

BACKGROUND OF THE INVENTION

A laser welding has been used for manufacturing a composite product which comprises a plurality of resin parts.

JP-2002-248688A shows that one resin part with a convex portion is welded to the other resin part by a laser beam, while the convex portion is pressed to the other resin part. JP-2003-19752A shows that one resin part is press-inserted to the other resin part receiving a laser beam so that two resin parts are welded together.

However, in JP-2002-248688A, since an end surface of the convex portion and a contacting surface of the other resin part have surface roughness, some clearances are not avoidable therebetween. Due to these clearances, the resin parts are not well welded to generate voids in a welded contacting portion, so that the strength and air-tightness of the welded contacting surface are deteriorated.

In JP-2003-19752A, when the resin part has a complicated shape or when the insert amount is small, some clearances are generated between contacting surfaces of two resin parts, whereby the resin parts are not well welded to generate voids in a welded contacting surface, so that the strength and air-tightness of the welded contacting surface are deteriorated. Even if the shape of the resin parts is simplified and the insert amount is made large, some cracks may be arisen in the resin parts.

SUMMARY OF THE INVENTION

The present invention is made in view of the foregoing matter and it is an object of the present invention to provide a method and an apparatus for manufacturing a composite product which has enough strength and air-tightness at the welded contacting surface of resin parts.

According to a method for manufacturing a composite product of the present invention, a first resin part and a second resin part are prepared, the first resin part having an opening of which inner diameter decreases in an axial direction thereof. The second resin part is inserted into the opening of the first resin part. An outer surface of the second resin part is pressed to an inner surface of the opening of the first resin part. Next, a laser beam is radiated to the contacting area between the outer surface of second resin part and the inner surface of first resin part, with pressing the outer surface to the inner surface.

According to an apparatus for manufacturing a composite product of the present invention, the apparatus includes a holding means for holding a first resin part having a opening of which an inner diameter decreases in an axial direction, a pressing means for pressing the second resin part inserted into the opening in an axial direction of the opening, and a radiating means for radiating a laser beam into a contacting part between an outer surface of the second resin part and an inner surface of the opening.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

First Embodiment

Figure 2:
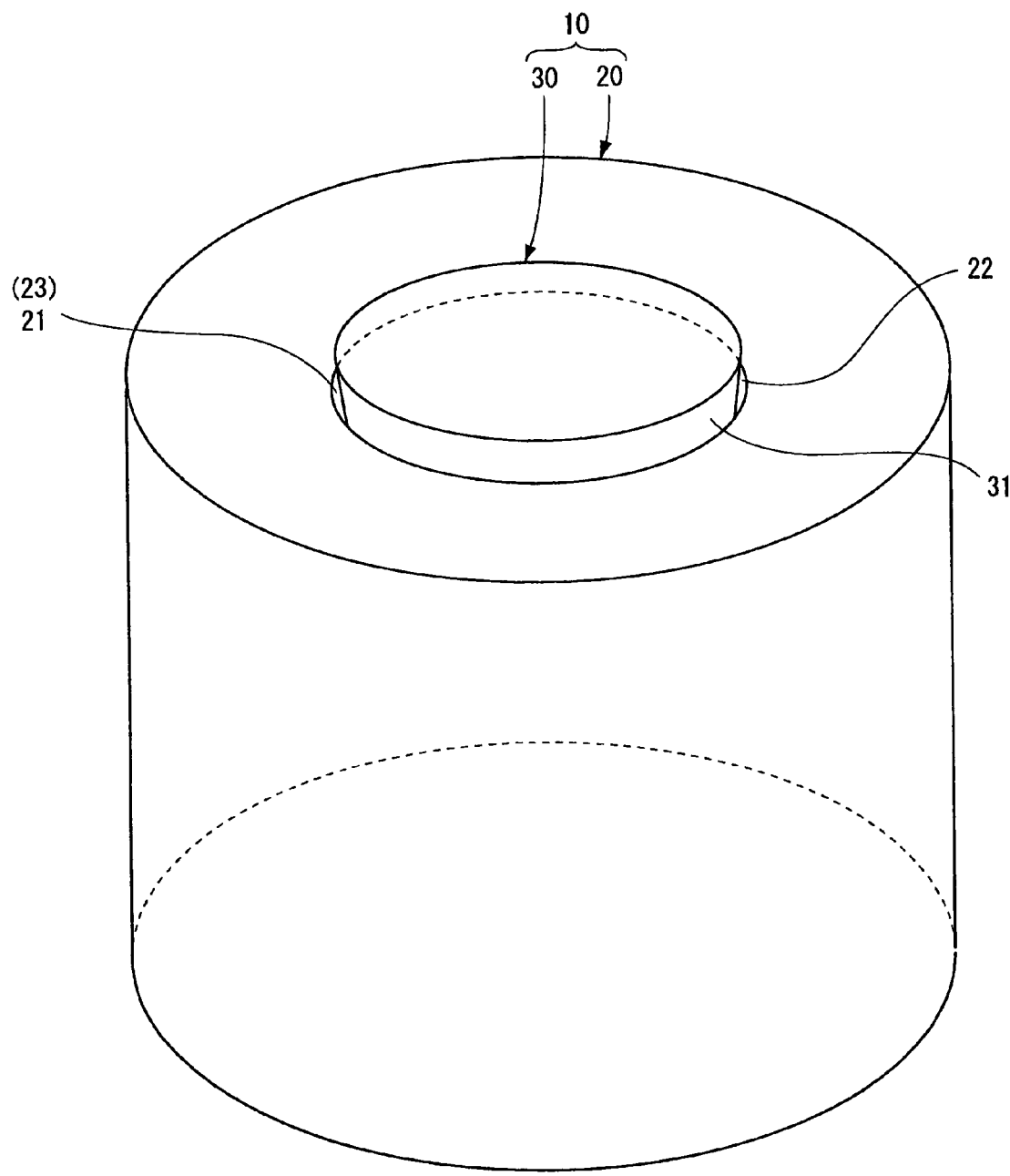
FIG. 2 is a perspective view of the composite product according to the first embodiment.
Figure 3:
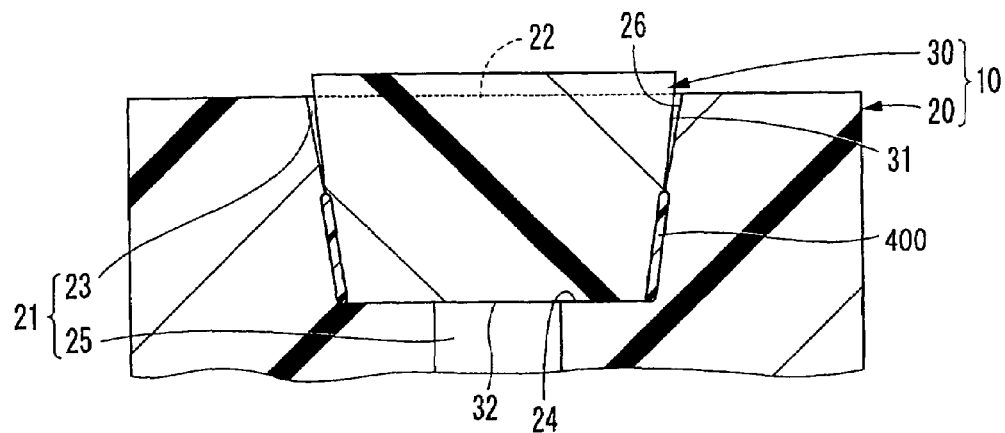
FIG. 3 is a cross sectional view of the composite product according to the first embodiment.

FIGS. 2 and 3 show a composite product, which comprises a body 20 and a lid 30. The body 20 corresponds to a first resin part and the lid 30 corresponds to a second resin part in the present invention.

The body 20 has a cylindrical shape having an inner opening 21. The inner opening 21 includes an aperture 22, a large opening 23 and a small opening 25 in this series. The large opening 23 has a larger inner diameter than that of the small opening 25. A connecting wall 24 connects the large opening 23 with the small opening 25. The connecting wall 24 has a flat annular surface perpendicular to the center axis of the inner opening 21.

The lid 30 is made of resin material to be disc-shaped, and is concentrically accommodated in the large opening 23 of the body 20. An outer circumferential wall 31 of the lid 30 is welded to an inner circumferential wall 26 of the large opening 23, whereby the outer circumferential wall 31 and the inner circumferential wall 26 are sealed with a welded contacting portion 400. A bottom surface 32 of the lid 30 is a flat surface perpendicular to a center axis of the lid 30 and is in contact with the connecting wall 24.

Figure 4:
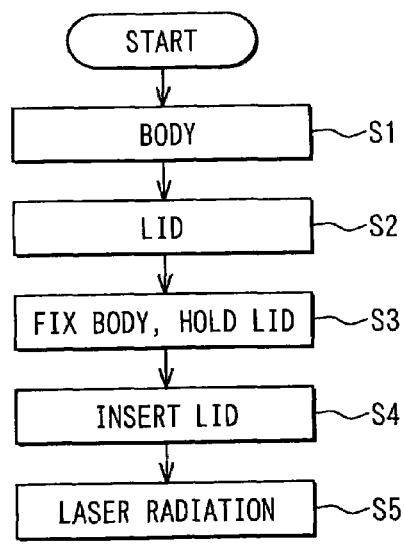
FIG. 4 is a flowchart showing a method for manufacturing the composite product according to the first embodiment.

Referring to a flowchart shown in FIG. 4, a method for manufacturing the composite product 10 is described hereinafter.

In steps S1 and S2, the body 20 and the lid 30 are prepared for a welding process. Concretely, the body 20 is made of a resin material which is transparent to a laser beam in step S1. The body 20 is preferably made of a thermoplastic resin which allows over 25% of the laser beam to pass therethrough. The thermoplastic resin is a resin such as polyamide, polypropylene, acrylonitrile-styrene copolymer, polybutylene terephthalate, and a resin material containing an adding agent which makes the resin transparent to the laser beam.

Figure 5:
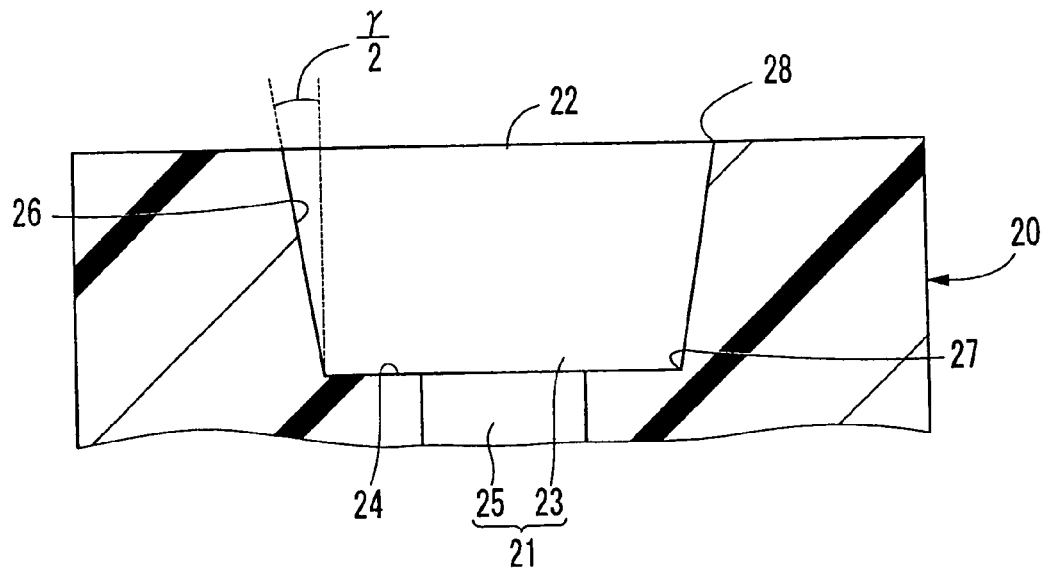
FIG. 5 is a schematic cross sectional view of a body of the composite product according to the first embodiment.

As shown in FIG. 5, the body 20 has a large opening 23 which is tapered in such a manner that the inner diameter continuously decreases in an axial direction from the aperture 22 of the inner opening 22 to the connecting wall 24. The taper angle γ of the inner circumferential wall 26 is less than 60° degree, so that the lid 30 is smoothly inserted into the large opening 23 in step S5. FIG. 5 schematically illustrates "γ/2" which is half of the taper angle γ.

In the present embodiment, the large opening 23 can be made taper-shaped in molding the body 20 to reduce a preparing period in step S1. Alternatively, an opening having a constant inner diameter is made by resin molding, after that, the tapered large opening 23 is made by cutting and/or grinding. The large opening 23 corresponds to an opening of the present invention.

In step S2, the lid 30 is made by resin molding, the lid 30 having a character absorbing the laser beam. The lid 30 is preferably made of a thermoplastic resin which allows less 5% of the laser beam to pass therethrough. The thermoplastic resin is a resin such as polyamide, polypropylene, acrylonitrile-styrene copolymer, polybutylene terephthalate, and a resin material containing an adding agent, such as carbon black which makes the resin transparent to the laser beam.

Figure 6:
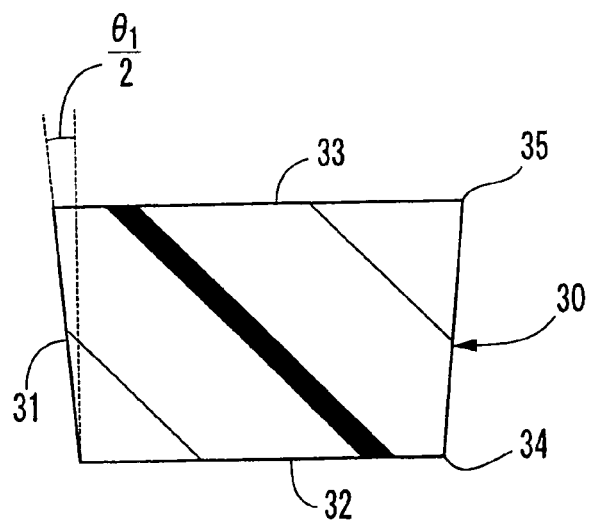
FIG. 6 is a schematic cross sectional view of a lid of the composite product according to the first embodiment.

In step S2, as shown in FIG. 6, the outer circumferential wall 31 is formed on the lid 30 in such a manner that the outer diameter of the outer circumferential wall 31 decreases in an axial direction from a top surface 33 to the bottom surface 32. As shown in FIGS. 5 and 6, a diameter of a bottom end 34 of the outer circumferential wall 31 is larger than an inner diameter of a bottom end 27 of the large opening 23 and is smaller than an inner diameter of a top end 28 of the large opening 23. The taper angle $\theta_1$ is smaller than the taper angel γ. FIG. 6 schematically illustrates "$\theta_1/2$" which is half of the taper angle $\theta_1$.

In the present embodiment, the outer circumferential wall 31 can be made taper-shaped in molding the lid 30 to reduce a preparing period in step S2. Alternatively, a blank having a constant outer diameter is made by resin molding, after that, the tapered outer circumferential wall 31 is made by cutting and/or grinding the blank to form the lid 30. Step S1 and S2 corresponds to a preparing step, and the outer circumferential wall 31 corresponds to a changing portion of the present invention.

Figure 1:
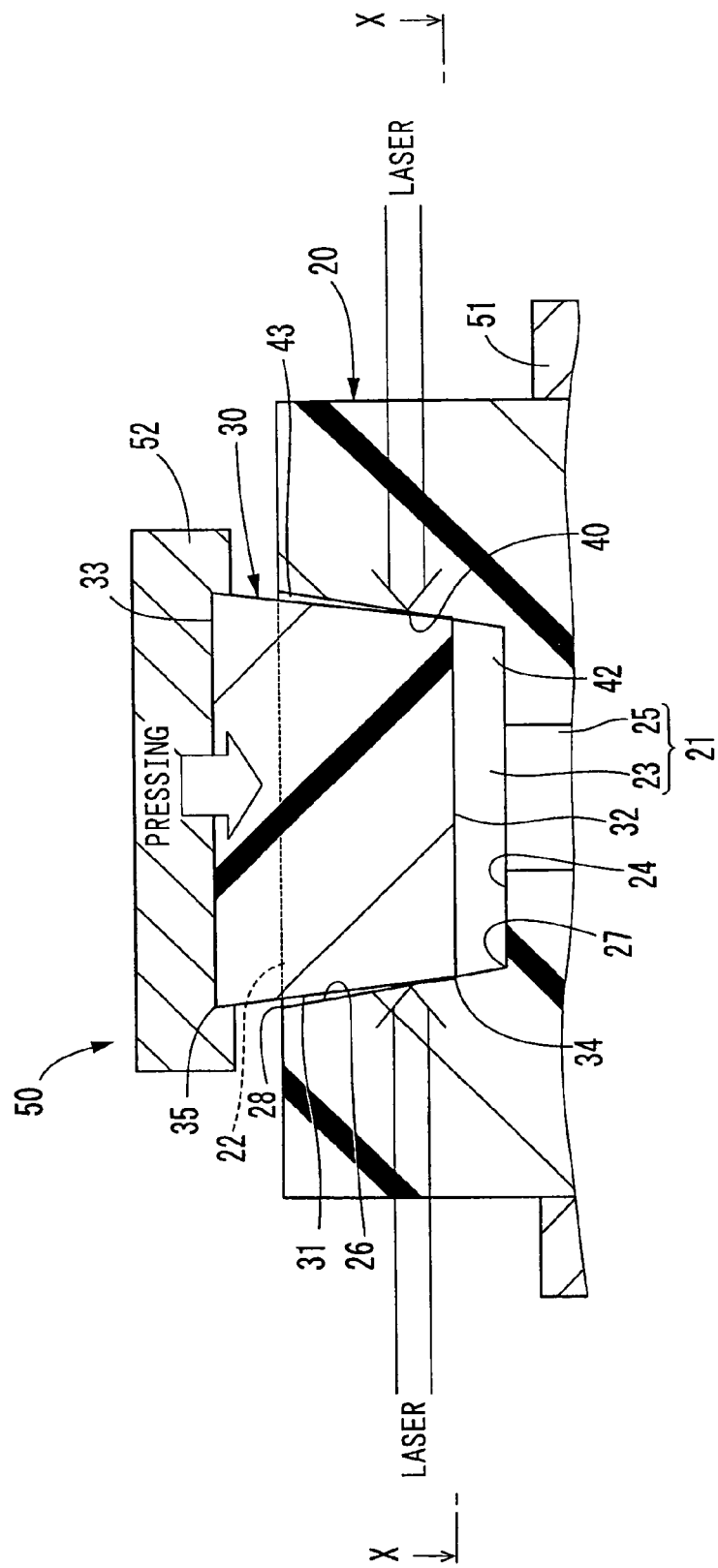
FIG. 1 is a schematic view showing a method and an apparatus for manufacturing a composite product according to a first embodiment.
Figure 7:
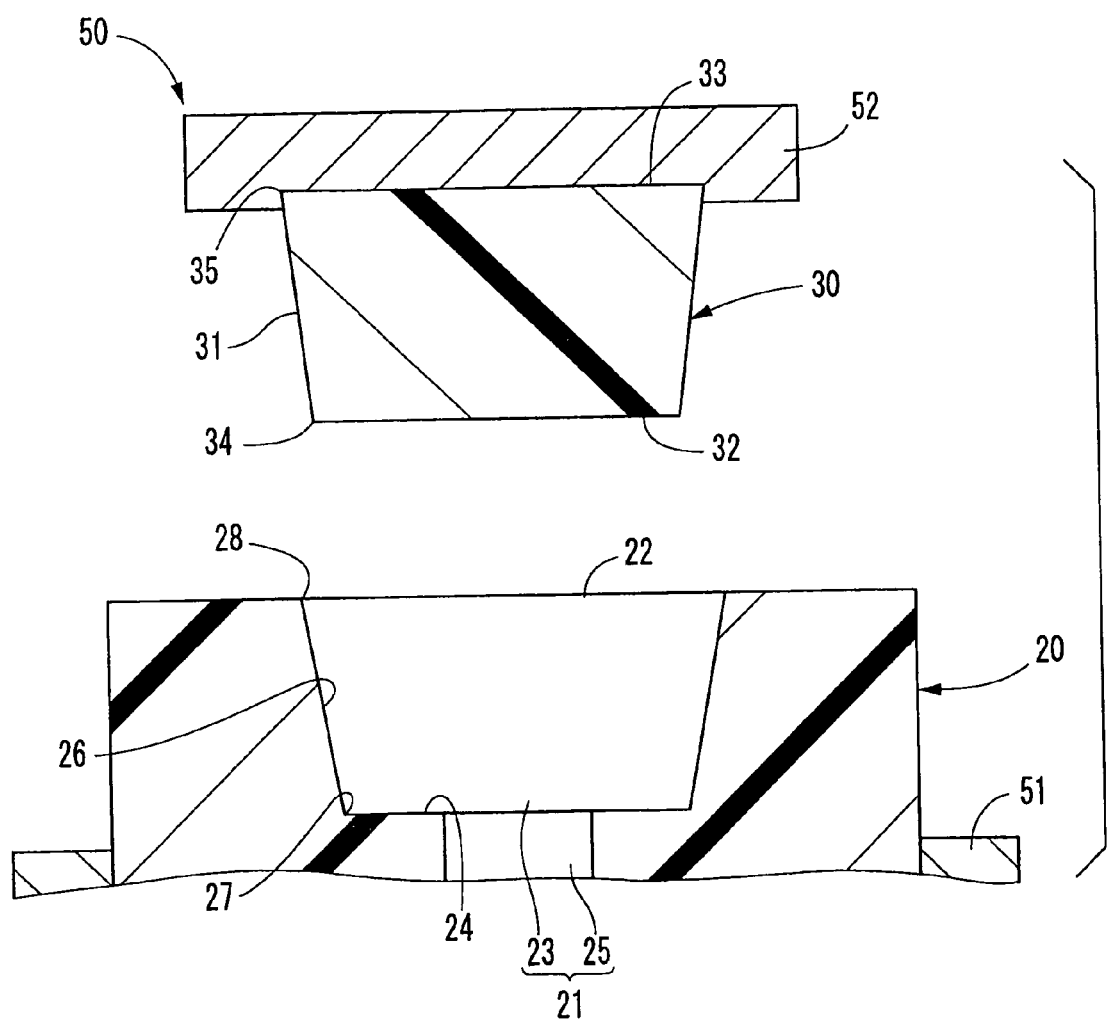
FIG. 7 is a cross sectional view for explaining the method and the apparatus for manufacturing the composite product according to the first embodiment.
Figure 8:
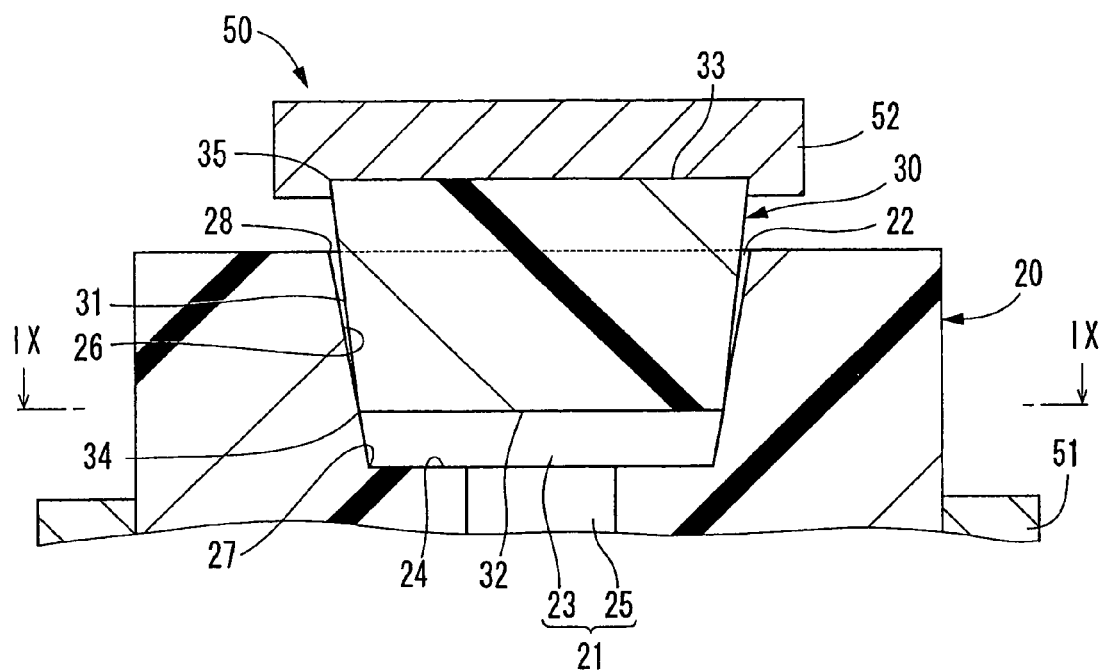
FIG. 8 is a cross sectional view for explaining the method and the apparatus for manufacturing the composite product according to the first embodiment.

In steps S3 to S5, the lid 30 is laser-welded to the body 20 using a welding apparatus 50 shown in FIGS. 1, 7, and 8. As shown in FIG. 7, a fixed jig 51 holds the body 20, and a movable jig 52 holds the lid 30 in step S3. The body 20 is fixed and the lid 30 is slidably hold in an axial direction thereof in such manner that the large opening 23 is confronting to the lid 30. The direction in which the diameter of the body 20 decreases is the same as the direction in which the inner diameter of the large opening 30 decreases.

Figure 9:
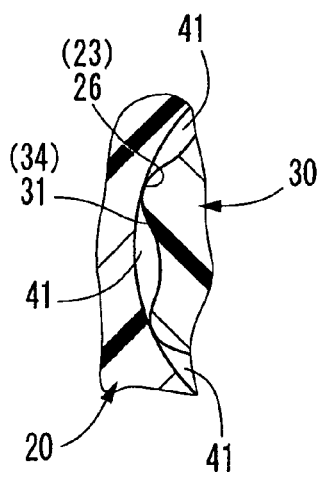
FIG. 9 is a cross sectional view along the line IX-IX of FIG. 8.

As shown in FIG. 8, the movable jig 52 moves down in an axial direction receiving a driving force of the power source (not shown) of the welding apparatus 50 in order to insert the lid 30 into the inner opening 21 from the aperture 22. After the lid 30 is inserted into the inner opening 21, the bottom end 34 of the outer circumferential wall 31 comes into contact with the inner circumferential wall 26 at all circumferential area. The bottom end 34 is brought into contact with an axially middle portion of the outer circumferential wall 31. As shown in FIG. 9, a plurality of clearances 41 are formed apart from each other in a circumferential direction between the inner circumferential wall 26 and the outer circumferential wall 31. These clearances are not avoidable due to the surface roughness of the inner circumferential wall 26 and the outer circumferential wall 31.

In step S5, the movable jig 52 moves the lid 30 in the axial direction to press the lid 30 toward the large opening 21, so that the bottom end 34 is pressed to the inner circumferential wall 26. Then, a laser beam from a laser apparatus (not shown) equipped with the welding apparatus 50 is radiated to a contacting surface 40 between the outer circumferential wall 31 and the inner circumferential wall 26. The laser beam is simultaneously radiated to the all circumference of the contacting surface 40 from the outside of the body 20, using a prism, a mirror and the like equipped with the welding apparatus 50. Thereby, the laser beam is precisely radiated to the contacting surface 40. The laser is selected from a grass-laser, a ruby-laser, a YAG-laser, titanium-sapphire-laser, He—Ne-laser, $CO_2$-laser, a noble-gas-laser, an excimer-laser, a semi-conductor-laser and the like, of which emitted power is adjusted according to the resin material of the body 20 and the lid 30.

Figure 10:
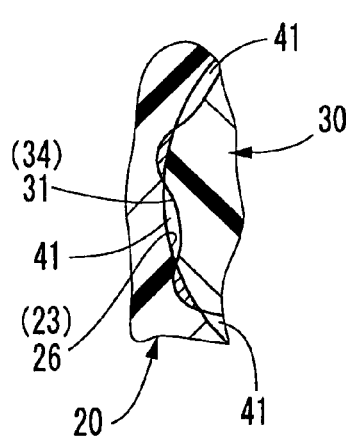
FIG. 10 is partial cross sectional view along the line X-X of FIG. 1.
Figure 11:
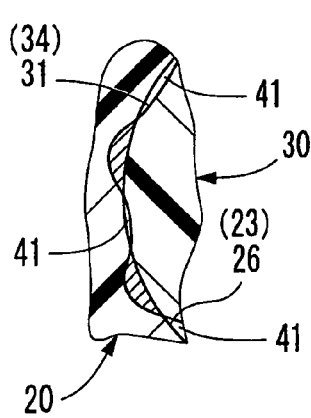
FIG. 11 is a partial cross sectional view.

At the beginning stage of step S5, as schematically sown in FIG. 10, the inner circumferential surface 26 overlaps the bottom end 34 at both sides of the clearances 41 in the circumferential direction. Then, the laser beam reaches to the contacting surface 40, passing through the body 20. The bottom end 34 absorbs the laser beam to be welded. The heat of the welded bottom end 34 is transferred to the overlapping portion of the inner circumferential wall 26 so as to be welded. After the resin material is welded as described above, the lid 30 moves down in the pressing direction so that the clearances 41 shrink. At the same time, the welded resin material flows into the clearances 41 to fill them up. Since the clearances 41 are filled with the resin material, no voids arise in the welded contacting portion 400 after the welded resin is solidified. Thus, the strength and the air-tightness at the welded contacting portion 400 between the body 20 and the lid 30 are not deteriorated.

In step S5, the laser radiation is maintained until the bottom surface 32 is brought into contact with the connecting wall 24.

Besides, in step S5, a space 42 is formed between the bottom surface 32 and the connecting wall 24 before the bottom surface 32 is brought into contact with the connecting wall 24. Since the space 42 shrinks according as the lid 30 moves down, the pressure in the space 42 increases according as the lid 30 moves down. Thereby the welded resin is restricted from flowing out through the space 42 into the small opening 25, so that burrs are hardly generated on the inner circumferential wall of the small opening 25. Furthermore, in step S5, the bottoms surface 32 is finally brought into contact with the connecting wall 21, so that the welded resin more hardly flows out into the small opening 25 to restrict generating the burrs.

Furthermore, in step S5, a second space 43 is formed between the inner circumferential wall 26 and the outer circumferential wall 31. Since the second space 43 communicates with the atmosphere, a gas generated from the welded resin can be expelled through the second space 43. Thus, generating of the voids in the welded contacting portion 400 is more restricted. Since the outer circumferential wall 31 of the lid 30 and the inner circumferential wall 31 are tapered in the same direction, the volume of the second space 43 is relatively small, so that inner pressure in the second space 43 is relatively large. Thus, the welded resin material is restricted from flowing out to the outside of the body 20 through the second space 43. Burrs hardly arise on the outer wall of the body 20.

Second Embodiment

Figure 12:
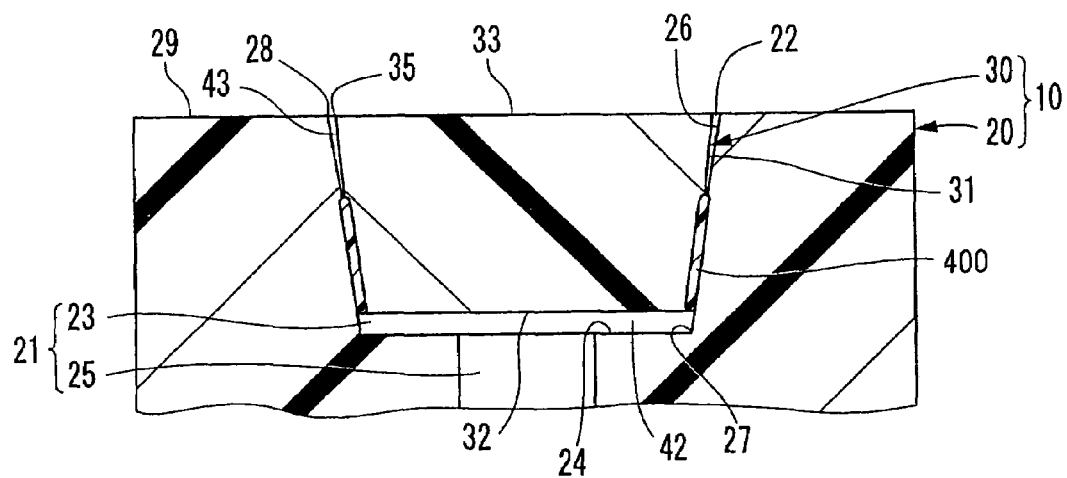
FIG. 12 is a schematic cross sectional view for explaining the method and the apparatus for manufacturing the composite product according to a second embodiment.

FIG. 12 shows a second embodiment of the present invention, which is a modification of the first embodiment. The differences between the first and the second embodiments are mainly described herein after.

In a method for manufacturing a composite product according to the second embodiment, after the execution of step S5, the bottom surface 32 is out of contact with the connecting wall 24 and the top surface 33 of the lid 30 is positioned on substantially the same plane as an end surface 29 of the body 20 without any steps. According to the second embodiment, the same effect as the first embodiment can be obtained except the effect of contacting between the bottom surface 32 and the connecting wall 24. Furthermore, since the top surface 33 does not protrude from the end surface 29, unexpected external forces are hardly applied to the lid 30, and the appearance of the composite product is not deteriorated.

Third Embodiment

Figure 13:
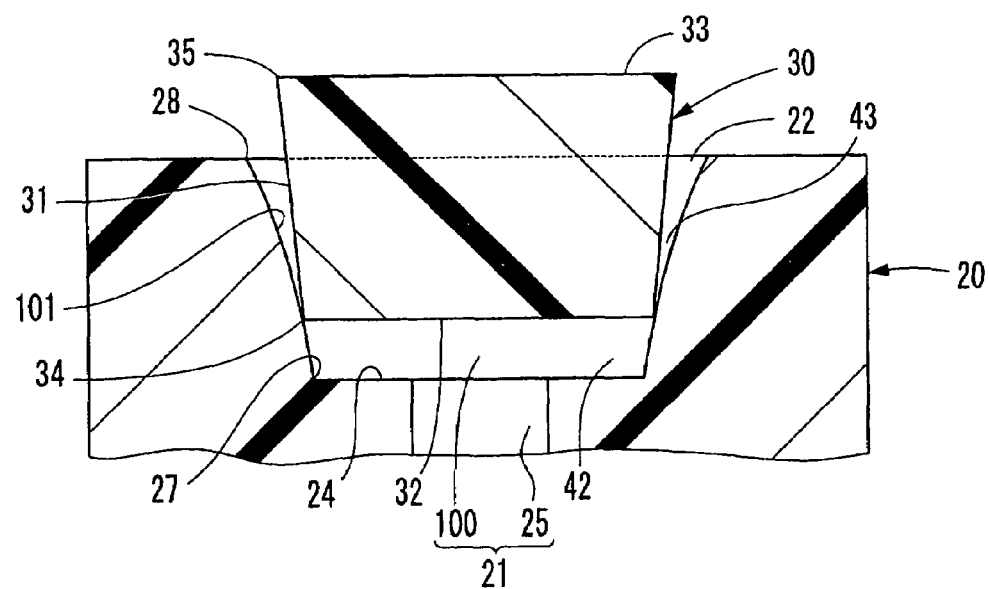
FIG. 13 is a schematic cross sectional view for explaining the method and the apparatus for manufacturing the composite product according to a third embodiment.

FIG. 13 shows a third embodiment of the present invention, which is a modification of the first embodiment. The differences between the first and the third embodiments are mainly described herein after.

In step S3 of the third embodiment, a large opening 100 is formed in the body 20 in such a manner that the inner diameter of the large opening 100 decreases in an axial direction from the aperture 22 to the connecting wall 24 and the changing rate of the inner diameter decreases according as it closes to the bottom end 27. An inner wall 101 of the large opening 100 has the same function as the inner circumferential wall 26 in the first embodiment.

Fourth Embodiment

Figure 14:
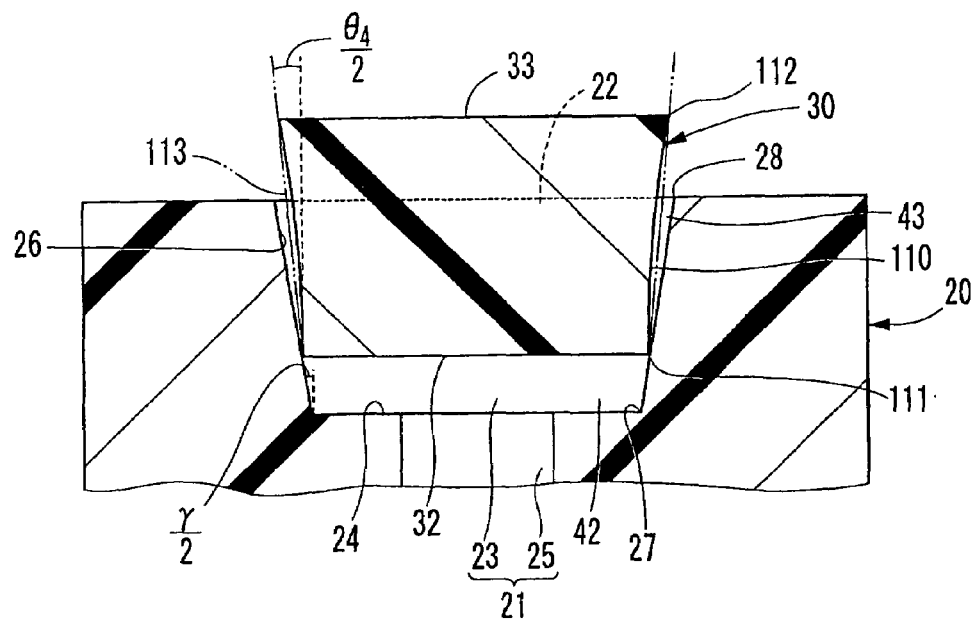
FIG. 14 is a schematic cross sectional view for explaining the method and the apparatus for manufacturing the composite product according to a fourth embodiment.

FIG. 14 shows a fourth embodiment of the present invention, which is a modification of the first embodiment. The differences between the first and the fourth embodiments are mainly described herein after.

In step S2 of the fourth embodiment, an outer circumferential wall 110 is formed on the lid 30 in such a manner that the outer diameter of the lid 30 decreases in an axial direction from the top surface 33 to the bottom surface 32 and the changing rate of the outer diameter decreases according as it closes to the bottom end 34 of the lid 30. The outer diameter of the bottom end 111 of the lid 30 is larger than the inner diameter of the bottom end 27 of the body 20 and is smaller than the inner diameter of the top end 28 of the body 20. A taper angle $\theta_4$ of a phantom taper plane 113 connecting the top end 112 and the bottom end 111 is formed so as to be smaller than the taper angle $\gamma$ of the inner circumferential wall 26 of the large opening 23. FIG. 14 schematically illustrates $\theta_4/2$ and $\gamma/2$ which are half of $\theta_4$ and $\gamma$.

In step S4, the bottom end 111 is brought into contact with the inner circumferential wall 26 at all peripheral thereof. In step S5, the lid 30 is pressed downwardly so that the bottom end 111 is pressed to the inner circumferential wall 26. Then the laser beam is radiated to the contacting surface between the outer circumferential wall 110 and the inner circumferential wall 26. The laser radiation is maintained until the bottom surface 32 of the lid 30 is brought into contact with the connecting wall 24 as well as the first embodiment.

According to the fourth embodiment, the outer circumferential wall 110 of the lid 30 functions as the outer circumferential wall 31 of the first embodiment. The fourth embodiment has the same effect as the first embodiment.

Fifth Embodiment

Figure 15:
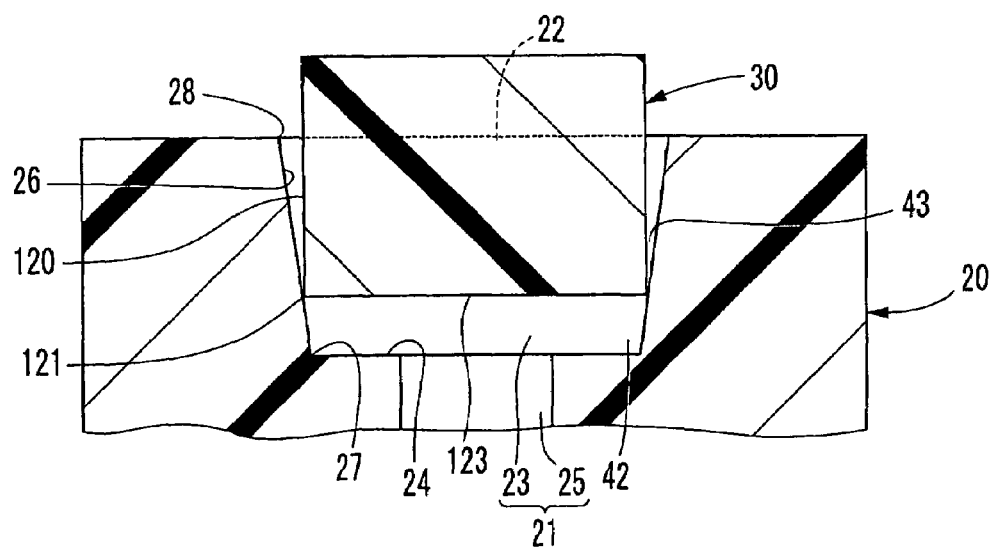
FIG. 15 is a schematic cross sectional view for explaining the method and the apparatus for manufacturing the composite product according to a fifth embodiment.

FIG. 15 shows a fifth embodiment of the present invention, which is a modification of the first embodiment. The differences between the first and the fifth embodiments are mainly described herein after.

In step S2, an outer circumferential wall 120 is formed on the lid 30, the outer circumferential wall 120 having a constant outer diameter in an axial direction thereof. The outer diameter of the lid 30 is larger than the inner diameter of the bottom end 27 of the body 20. In step S3, the lid 30 is brought to confront the large opening 23 on the same axis, then in step S4, a bottom end 121 of the lid 30 is brought into contact with the inner circumferential wall 26 in a circumferential direction thereof. In step S5, the lid 30 is pressed downwardly so that the bottom end 121 of the lid 30 is pressed to the inner circumferential wall 26. Then, the laser beam is radiated to the contacting surface between the outer circumferential wall 120 and the inner circumferential wall 26. The laser radiation is maintained until the bottom surface 123 of the lid 30 is brought into contact with the connecting wall 24.

According to the fifth embodiment, the outer circumferential wall 120 and the bottom surface 123 of the lid 30 function as the outer circumferential wall 31 and the bottom end 32 of the first embodiment. The fifth embodiment has the same effect as the first embodiment.

Sixth Embodiment

Figure 16:
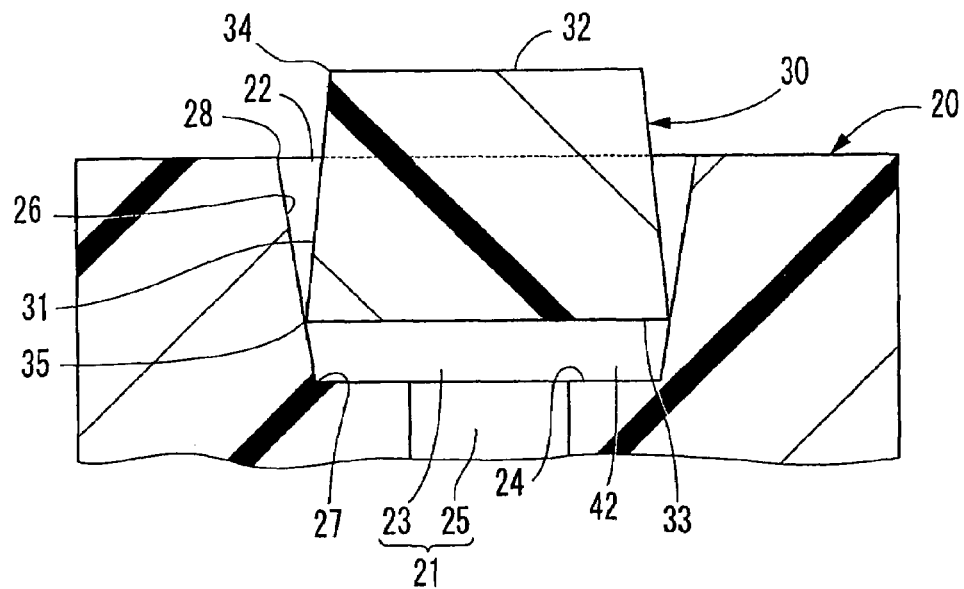
FIG. 16 is a schematic cross sectional view for explaining the method and the apparatus for manufacturing the composite product according to a sixth embodiment.

FIG. 16 shows a sixth embodiment of the present invention, which is a modification of the first embodiment. The differences between the first and the sixth embodiments are mainly described herein after.

In step S2 of the sixth embodiment, the bottom end 35 of the lid 30 is formed in such a manner that the outer diameter of the bottom end 35 is larger than the bottom end 27 of the body 20 and is smaller than the top end 28 of the body 20. In step S3, the lid is brought to confront the large opening 23 in such a manner that the diameter decreasing directions thereof are opposite to each other. In step S4, the bottom end 35 of the outer circumferential wall 31 is brought into contact with the inner circumferential wall 26 in a circumferential direction thereof. In step S5, the bottom surface 35 is pressed to the inner circumferential wall 26, then the laser beam is radiated to the contacting surface between the outer circumferential wall 31 and the inner circumferential wall 26. The laser radiation is maintained until the bottom surface 33 of the lid 30 is brought into contact with the connecting wall 24.

In step S5, the clearances between the outer circumferential wall 31 and the inner circumferential wall 26 are filled with the welded resign as well as the first embodiment. Thus, the strength and an air tightness are not deteriorated.

In step S5, the bottom surface 130 functions as the bottom surface 32 of the first embodiment to form the space 42 to prevent burrs. A straight wall 133 functions as the outer circumferential wall 26 of the first embodiment to form a second space 43, so that any voids are restricted from being generated.

In step S2, the outer circumferential wall 31 can be made in such a manner that the outer diameter of the lid 30 decreases in the axial direction from the bottom end 33 to top end 32, and the changing rate of the diameter decreases according as it closes to the top end 32. Alternatively, the changing rate of the diameter increases according as it closes to the top end 32.

Seventh Embodiment

Figure 17:
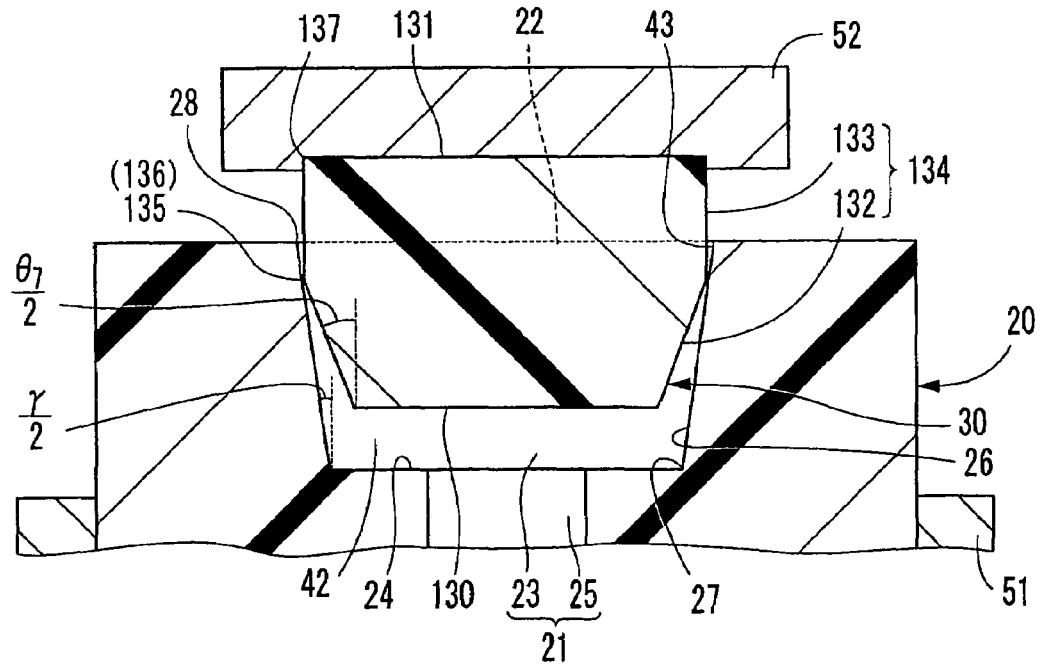
FIG. 17 is a schematic cross sectional view for explaining the method and the apparatus for manufacturing the composite product according to a seventh embodiment.

FIG. 17 shows a seventh embodiment of the present invention, which is a modification of the first embodiment. The differences between the first and the seventh embodiments are mainly described herein after.

In step S2 of the seventh embodiment, an outer circumferential wall 134 is formed on the lid 30 in such a manner that the outer circumferential wall 134 includes a changing part 132 and a straight part 133 in this series from the bottom surface 130 to the top surface 131. The changing part 132 is formed tapered in such a manner that the outer diameter decreases in a direction from the straight part 133 to the bottom surface 130. The outer diameter of the end 135 of the changing part 132 close to the straight part 133 is larger than the inner diameter of the bottom end 27 and is smaller than the inner diameter of the top end 28 of the body 20. A taper angle $\theta_7$ is larger than the taper angle $\gamma$ of the inner circumferential wall 26. FIG. 17 schematically illustrates $\theta_7/2$ and $\gamma/2$ which are half of $\theta_7$ and $\gamma$. The diameter of straight part 133 is constant in the axial direction.

In step S3, the fixed jig 51 holds the body 20 and the movable jig 52 holds the straight part 133 in such a manner that the lid 30 confronts to the large opening 22 on the same center axis. In step S4, the end 135 of the changing part 132 is brought into contact with the inner circumferential wall 26 in a circumferential direction. In step S5, the end 135, which is the end 136 of the straight part 133, is pressed into the inner circumferential wall 26, then the laser beam is radiated to the contacting surface of the outer circumferential wall 134 and the inner circumferential wall 26. The laser radiation and the pressing of the lid 30 are maintained in step S5 until the bottom surface 130 of the lid 30 is brought into contact with the connecting wall 24.

According to the seventh embodiment, clearances between the outer circumferential surface 134 and the inner circumferential surface 26 are filled with the welded resin material to be shrunk. Thus, the strength and the air-tightness at the welded portion between the body 20 and the lid 30 are not deteriorated.

The bottom surface 130 of the lid 30 functions as the bottom surface 32 of the first embodiment in step S5, so that burrs are restricted.

The straight part 133 functions as the outer circumferential wall 31 of the first embodiment to form the second space 43 in step S5. Thus, the voids and burrs are restricted.

In step S2, the changing part 132 can be made in such a manner that the changing rate of outer diameter decreases toward the bottom surface 130.

A second changing part can be made instead of the straight part 133, the outer diameter of the second changing part decreasing toward the top surface 131. The end 135 is pressed to the inner circumferential wall 26.

The straight part 133 may not be formed in step S2.

Eighth Embodiment

Figure 18:
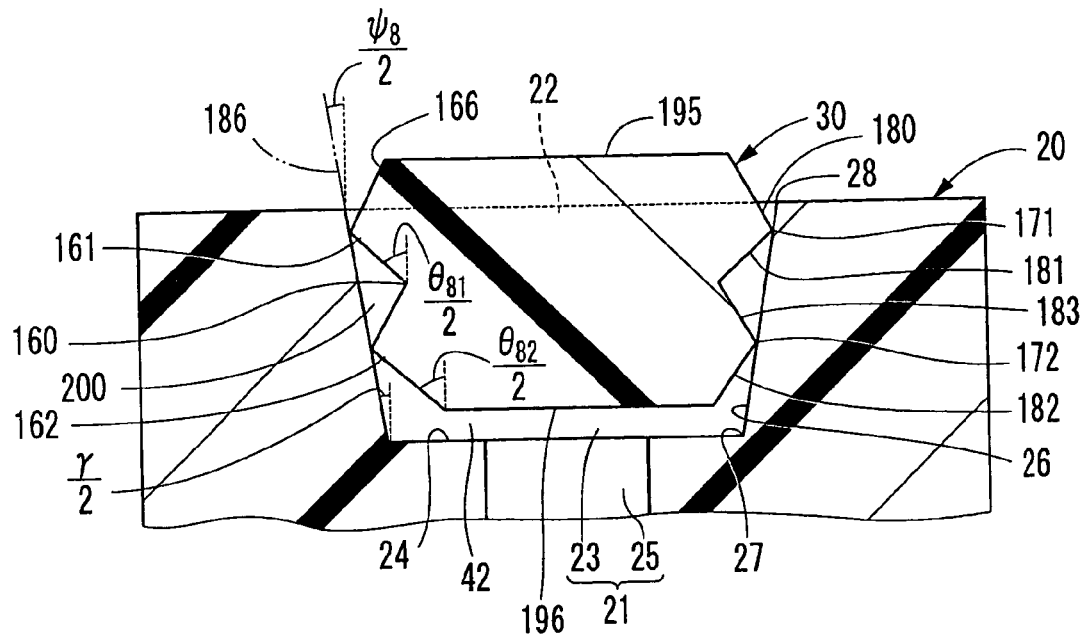
FIG. 18 is a schematic cross sectional view for explaining the method and the apparatus for manufacturing the composite product according to a eighth embodiment.

FIG. 18 shows an eighth embodiment of the present invention, which is a modification of the first embodiment. The differences between the first and the eighth embodiments are mainly described herein after.

In step S2 of the eighth embodiment, annular convex portions 161, 162 are formed on the outer circumferential wall 166. Each of annular convex portions 161, 162 is disposed apart from each other in an axial direction, and an annular concave portion 160 is formed between the annular convex portions 161, 162. The annular convex portions 161, 162 have a triangle cross-section and have protruding edges 171, 173. Inclined walls 181, 183 of the annular convex portions 161, 162 are confronting to each other to form the annular concave portion 160. The taper angle $\theta_{81}$, $\theta_{82}$ are larger than the taper angle $\gamma$. The protruding heights of the annular convex portions 161, 162 are set in such a manner that a taper angle $\psi_8$ of a tapered phantom plane 186 connecting the protruding edges 171, 173 is consistent with the taper angle $\gamma$ of the inner circumferential wall 26. The outer diameter of the protruding edge 172 is smaller than that of the protruding edge 171. Both of the outer diameters of the protruding edges 171, 172 are larger than the inner diameter of the bottom end 27 and are smaller than the inner diameter of the top end 28. FIG. 18 schematically illustrates $\theta_{81}/2$, $\theta_{82}/2$, $\psi_8/2$ and $\gamma/2$.

In step S3, the lid 30 is brought to be confronted to the large opening 23. In step S4, the protruding edges 171, 172 come to contact with the inner circumferential wall 26 in a circumferential direction. In step S5, the protruding edges 171, 172 are pressed to the inner circumferential wall 26, and then the laser beam is radiated to contacting surfaces between the convex portions 161, 162 and the inner circumferential wall 26. The laser radiation and the pressing of the lid 30 are maintained in step S5 until the bottom surface 196 of the lid 30 is brought into contact with the connecting wall 24.

According to the eighth embodiment, the clearances between the annular convex portions 161, 162 and the inner circumferential wall 26 are filled with the welded resin material to be shrunk. Thus, the strength and the air-tightness at the welded portion are not deteriorated.

The bottom surface 196 of the lid 30 forms the space 42 as well as the bottom surface 32 of the first embodiment.

Furthermore, a doughnut-shaped space 200 is formed between the concave portion 160 and the inner circumferential wall 26. The doughnut-shaped space 200 is a closed space if the clearances between the annular convex portions 161, 162 and the inner circumferential wall 26 are neglected. Thus, the welded resin material flows into the space 200 to be compressed, and voids hardly arise in the solidified resin in the space 200.

In the step S5, the laser beam can be radiated to only one contacting surface out of the contacting surface between the annular projecting portion 161 and the inner circumferential wall 26 and the contacting surface between the annular convex portion 162 and the inner circumferential wall 26. Not laser radiated convex portion is press-inserted into the large opening 23.

The inclining changing rate of the inclined wall 181, 182 and the inclined wall 180, 183 can be varied along the slope thereof. At lest one of the inclined walls 181, 182 and the inclined walls 180, 183 can be made vertical walls with respect to the center axis of the lid 30 in step S2. The taper angle of the inclined walls 181, 182 and the inclined walls 180, 183 can be made larger than the taper angle γ. Alternatively, at least one of the inclined wall 180, 183 can be made perpendicular wall.

Figure 19:
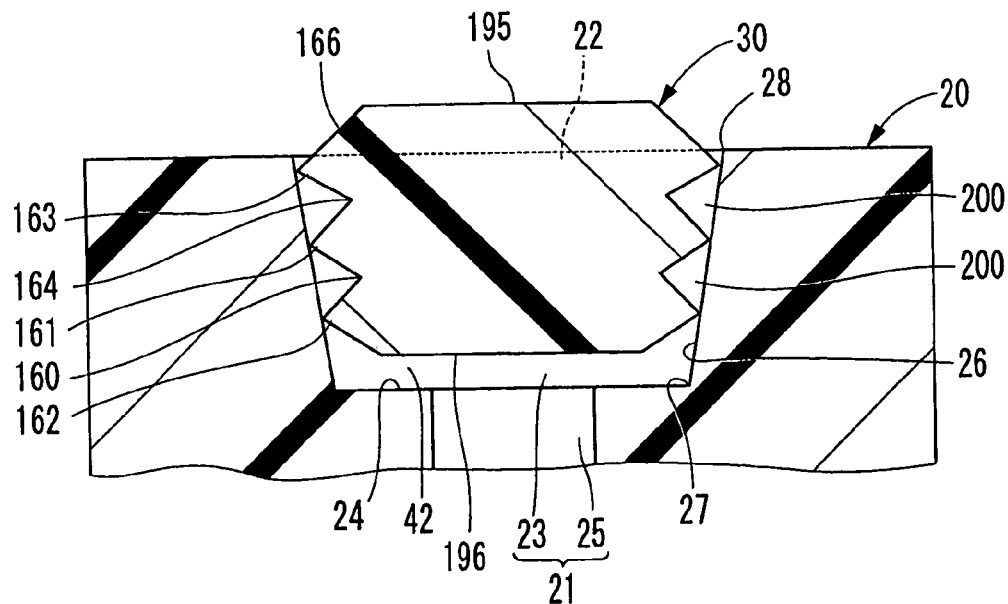
FIG. 19 is a schematic cross sectional view for explaining the method and the apparatus for manufacturing the composite product according to a modification of the eighth embodiment.

FIG. 19 shows a modification of the eighth embodiment, in which three annular convex portions 161, 162, 163 are formed. Two annular concave portions 160, 164 are formed between the convex portions 161, 162, 163.

Ninth Embodiment

Figure 20:
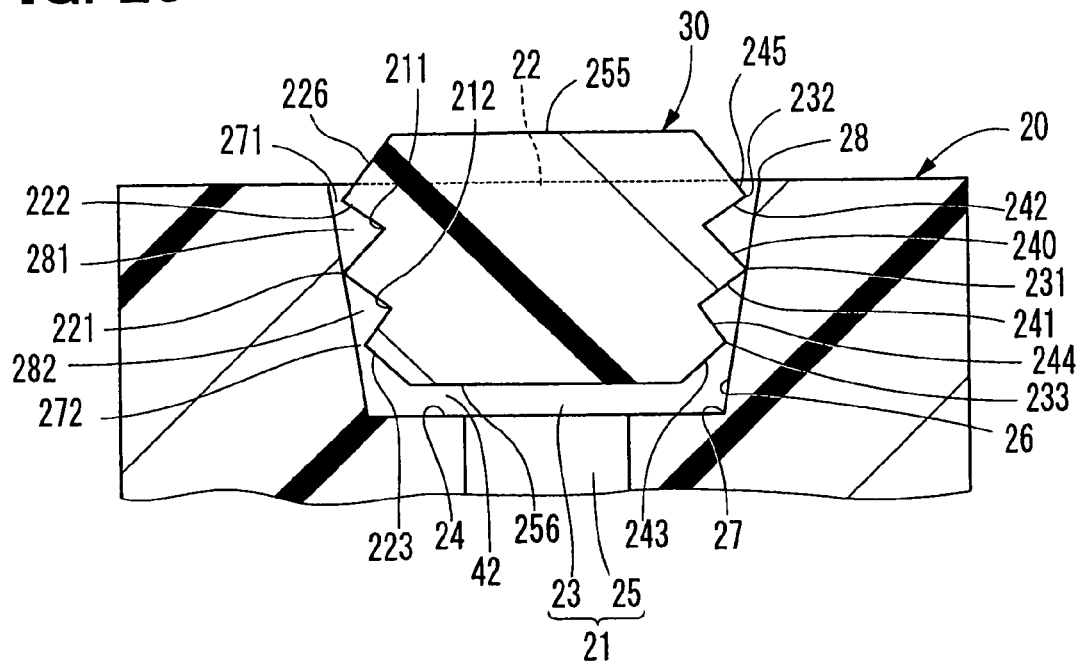
FIG. 20 is a schematic cross sectional view for explaining the method and the apparatus for manufacturing the composite product according to a ninth embodiment.
Figure 21:
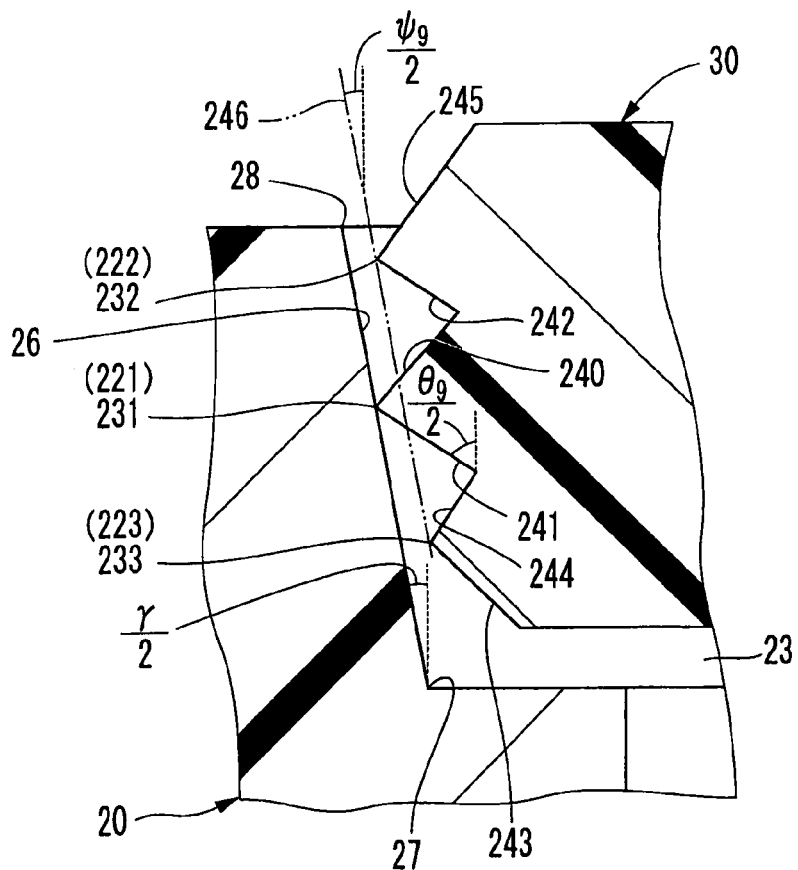
FIG. 21 is an enlarged cross sectional view of essential part in FIG. 20.

FIGS. 20 and 21 show a ninth embodiment of the present invention, which is a modification of the first embodiment. The differences between the first and the ninth embodiments are mainly described herein after.

Three annular convex portions 221, 222, and 223 are formed on the lid 30. Only a projecting edge 231 of the annular convex portion 221 is in contact with the inner circumferential wall 26. The other projecting edges 232, 233 are not in contact with the inner circumferential wall 26. The taper angle $\theta_9$ of the inclined surface 241 is larger than the taper angle γ of the inner circumferential wall 26. A taper angle $\psi_9$ of a tapered phantom plane 246 connecting the projecting edges 232 and 233 is almost the same as the taper angle γ of the inner circumferential wall 26. FIG. 21 schematically illustrates $\theta_9/2$, $\psi_9/2$ and γ/2. The projecting edge 231 is positioned outside of the tapered phantom plane 246. The outer diameter of the projecting edge 231 is larger than the inner diameter of the bottom end 27 and is smaller than the inner diameter of the top end 28.

In step S3, the lid 30 is brought to confront the large opening 23 in the axial direction thereof. In step S4, the protruding edge 231 of the annular convex portion 221 comes into contact with the inner circumferential wall 26 in the circumferential direction. The other protruding edges 232 and 233 are apart from the inner circumferential wall 26. In step S5, the projecting edge 231 is pressed to the inner circumferential wall 26, and then the laser beam is radiated to the contacting surface between the annular convex portion 221 and the inner circumferential wall 26. The laser radiation and the pressing of the lid 30 are maintained in step S5 until the bottom surface 256 of the lid 30 is brought into contact with the connecting wall 24, while the projecting edges 232, 233 are not in contact with the inner circumferential wall 26.

The clearances between the annular convex portion 221 and the inner circumferential wall 26 are filed with a welded resin material to be shrunk in step S5. The bottom surface 256 functions as the bottom surface 32 of the first embodiment to form the space 42, which restricts burrs. Furthermore, opened spaces 281, 282 are provided between the annular concave portions 222, 223 and the inner circumferential wall 26. The spaces 281, 282 communicate with the atmosphere through clearances 271, 272. Since the radial widths of the clearances 271, 272 are smaller than that of the spaces 281, 282, the inner pressure of the spaces 281, 282 increases. Thus, the welded resin hardly flows out to the outside of the body 20 and to the small opening 25 through the clearances 271, 272. The gas generated from the welded resin can be expelled to the atmosphere through the clearance 271, so that the voids in the welded surface are reduced.

The inclining changing rate of the inclined wall 240 can be varied along the slope. The taper angle of the inclined wall 240 can be set smaller than the taper angle γ. Besides, one of the annular convex portions 222 and 223 can be omitted.

Tenth Embodiment

Figure 22:
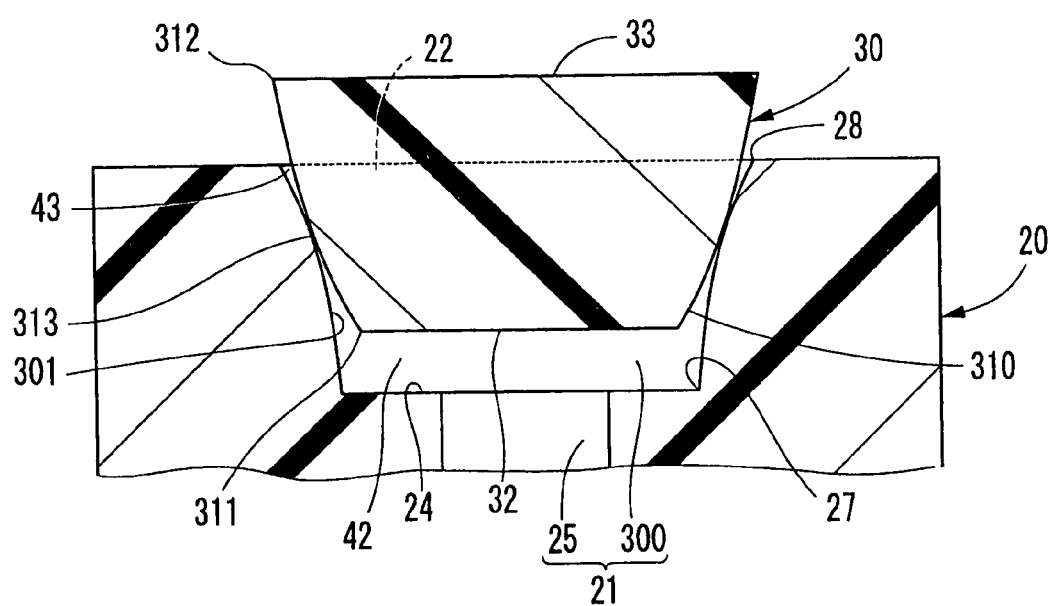
FIG. 22 is a schematic cross sectional view for explaining the method and the apparatus for manufacturing the composite product according to a tenth embodiment.

FIG. 22 shows a tenth embodiment of the present invention, which is a modification of the first embodiment. The differences between the first and the tenth embodiments are mainly described herein after.

In step S1, a large opening 300 is formed in the body 20 in such a manner that an inner diameter of the large opening 300 decreases in an axial direction from the aperture 22 toward the connecting wall 24 and that a decreasing rate of the inner diameter decreases in the same direction. In step S2, an outer circumferential wall 310 is formed on the lid 30 in such a manner that the outer diameter decreases in the axial direction from the top surface 33 to the bottom surface 32 and a decreasing rate of the outer diameter increases in the axial direction according as it closes to the bottom surface 27.

In step S4, the middle portion 313 of the outer circumferential wall 310 is brought into contact with the inner circumferential wall 301 of the large opening 300 in the circumferential direction, the middle portion 313 being positioned between the bottom end 311 and the top end 312 of the lid. In step S5, the middle portion 313 is pressed to the inner circumferential wall 310, and then the laser beam is radiated to the contacting surface between the outer circumferential wall 310 and the inner circumferential wall 301. The laser radiation and the pressing of the lid 30 are maintained in step S5 until the bottom surface 32 of the lid 30 is brought into contact with the connecting wall 24 as well as the first embodiment.

The inner circumferential wall 301 of the large opening 300 functions as the inner circumferential wall 26 of the first embodiment. The outer circumferential wall 310 of the lid 30 functions as the inner circumferential wall 26 of the first embodiment.

The large opening 300 can be made tapered shape as well as the large opening 23 of the first embodiment. The outer circumferential wall 310 can be made tapered shape as well as the outer circumferential wall 31 of the first embodiment. The tenth embodiment has the same effect as the first embodiment.

In step S1, the large opening 300 can be made a tapered opening as well as the large opening 23 of the first embodiment. The outer circumferential wall 310 can be made tapered shape as well as the outer circumferential wall 31 of the first embodiment.

In the first to tenth embodiments, step S2 is executed after step S1. However, step S1 can be executed after Step S2, or step S1 and step S2 can be executed simultaneously.

In the first to tenth embodiments, the body 20 is made of the material which can pass the laser beam therethrough, and the lid 30 is made of the material which can absorb the laser beam. On the other hand, the body 20 can be made of the material which absorbs the laser beam, and the lid 30 can be made of the material which can pass the laser beam therethrough. In this case, the laser beam is radiated from the top end 33 of the lid 30 toward the contacting surface in step S5.

In the third to tenth embodiments, the bottom surface 32, 33, 123, 130, 196, and 256 can be apart from the connecting surface 24.

In the fourth to ninth embodiments, the large opening can be made as same as the large opening 100 of the third embodiment in step S1.

In the first to tenth embodiments, the large opening 23 may have a cross-section other than a circle.

What is claimed is:

1. A method for manufacturing a composite product by welding a first resin part to a second resin part with a laser beam, the method comprising:
   preparing the first resin part and the second resin part, the first resin part having an opening of which inner diameter continuously decreases at a first angle in an axial direction thereof, the second resin part having a changing part of which outer diameter decreases at a second angle in the axial direction, the first angle and the second angle having a different value respectively from each other;
   inserting the changing part of the second resin part into the opening of the first resin part;
   pressing an outer surface of the second resin part to an inner surface of the opening of the first resin part; and
   radiating the laser beam to the contacting area between the outer surface of second resin part and the inner surface of first resin part, while pressing the outer surface to the inner surface, whereby the second resin part moves in the pressing direction, wherein
   the second resin part is prepared in such a manner that a smallest outer diameter of the changing part at its end is larger than a smallest inner diameter of the opening at its end,
   the end of the changing part having the smallest diameter is pressed into the inner surface of the opening while the laser beam is radiated, and
   the first resin part is prepared in such a manner that the opening is tapered; and the second resin part is prepared in such a manner that the changing part has a taper angle which is smaller than a taper angle of the opening.

2. The method for manufacturing a composite product according to claim 1, wherein the first resin part is prepared in such a manner that the taper angle of the opening is less than 60° degree.

* * * * *